United States Patent
Wu

(10) Patent No.: US 7,623,583 B2
(45) Date of Patent: Nov. 24, 2009

(54) APPARATUS AND METHOD FOR TRACKING A SAMPLING CLOCK OF MULTI-CARRIER COMMUNICATION SYSTEM

(75) Inventor: Kuo-Ming Wu, Nan-Tou Hsien (TW)

(73) Assignee: Realtek Semiconductor Corp., HsinChu (TW)

( * ) Notice: Subject to any disclaimer, the term of this patent is extended or adjusted under 35 U.S.C. 154(b) by 588 days.

(21) Appl. No.: 11/307,095

(22) Filed: Jan. 23, 2006

(65) Prior Publication Data
US 2006/0198481 A1    Sep. 7, 2006

(30) Foreign Application Priority Data
Jan. 24, 2005  (TW) ............................... 94102064 A

(51) Int. Cl.
*H04K 1/10* (2006.01)
(52) U.S. Cl. .................. 375/260; 375/150; 375/142; 375/147; 375/152; 375/326; 375/343; 375/375
(58) Field of Classification Search .......... 375/260, 375/150, 142, 147, 152, 326, 375
See application file for complete search history.

(56) References Cited

U.S. PATENT DOCUMENTS

| | | |
|---|---|---|
| 2002/0021715 A1* | 2/2002 | Matheus et al. ............. 370/480 |
| 2004/0114675 A1* | 6/2004 | Crawford .................... 375/149 |
| 2005/0163238 A1* | 7/2005 | Fujii ......................... 375/260 |

\* cited by examiner

*Primary Examiner*—Shuwang Liu
*Assistant Examiner*—Kabir A Timory
(74) *Attorney, Agent, or Firm*—Winston Hsu

(57) ABSTRACT

An apparatus and a method for tracking a sampling clock of a multi-carrier communication system are disclosed, the apparatus including a data removal module, a phase estimation module, and a sampling clock offset computation module. The data removal module is for generating a plurality of first and second data removal symbols by removing predetermined transmitted data from a plurality of first and second received symbols, respectively. The phase estimation module for generating a first and a second phase shifts according to correlations of the plurality of first and second data removal symbols. The sampling clock offset computation module for generating a control signal utilized to compensate the sampling clock of a plurality of received symbols according to the first and a second phase shifts.

13 Claims, 2 Drawing Sheets

US 7,623,583 B2

APPARATUS AND METHOD FOR TRACKING A SAMPLING CLOCK OF MULTI-CARRIER COMMUNICATION SYSTEM

BACKGROUND OF THE INVENTION

1. Field of the Invention

The present invention relates to a communication system, and more specifically, to an apparatus and a related method for tracking a sampling clock of a multi-carrier communication system.

2. Description of the Prior Art

As is well known in the art, a multi-carrier communication system utilizes a plurality of sub-carriers to modulate predetermined transmitted data, then proceeds to transmit the modulated data to a receiver in the form of a continuous data flow. At this time, the receiver samples the above-mentioned continuous data flow utilizing a sampling clock. A phase shift may exist between the received symbol generated by the receiver and the original transmitted data transmitted by the transmitter. This is apparent when the frequency of the sampling clock shifts by a small offset. This phase shift may cause inter-carrier interference (ICI) regarding the received symbol.

A multi-carrier communication system compensates the above-mentioned N received symbols by estimating a sampling clock offset which makes use of pilot symbols. The sampling clock offset is estimated according to the received symbol R and a predetermined data X corresponding to the pilot symbol to eliminate the error caused by the offset.

Please refer to the following equation of the received symbol R in terms of the predetermined data X and other variables:

$$R_{i,j,k} = e^{-j2\pi \frac{k}{N}\tau_{i,j}} \cdot e^{j\psi_{i,j}} \cdot H_{j,k} \cdot X_{i,j,k} + N_{i,j,k} \qquad \text{equation (1)}$$

$R_{i,j,k}$ denotes a received symbol transmitted by a $k^{th}$ sub-carrier within a $j^{th}$ band during a $i^{th}$ time period. $\tau_{i,j}$ denotes a phase difference resulting from a sampling clock offset. $\psi_{i,j}$ denotes a carrier phase shift. H denotes a channel estimation value. $N_{i,j,k}$ denotes a noise signal in the channel.

According to the related art, estimation of the sampling clock offset $\tau_{i,j}$ is necessary in order to eliminate errors concealed in the received symbol R. However, the receiver must perform a large number of computations regarding the carrier phase shift $\psi_{i,j}$, the channel estimation value H, and the noise signal $N_{i,j,k}$, to obtain the sampling clock offset $\tau_{i,j}$. Unfortunately, a great deal of resources is consumed during the above-mentioned computation processes.

SUMMARY OF THE INVENTION

One of the objectives of the claimed invention is to provide an apparatus and a related method for tracking a sampling clock of a multi-carrier communication system.

According to the claimed invention, a method for tracking a sampling clock of a multi-carrier communication system is disclosed. The steps of the method include generating a plurality of first data removal symbols by removing a predetermined transmitted data from a plurality of first received symbols, and generating a plurality of second data removal symbols by removing a predetermined transmitted data from a plurality of second received symbols. The steps of the method further include generating a first phase shift according to correlation of the first data removal symbols, and generating a second phase shift according to correlation of the second data removal symbols. Subsequently, a control signal for the compensation of the sampling clock of a plurality of received symbols according to the first and the second phase shifts is generated.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
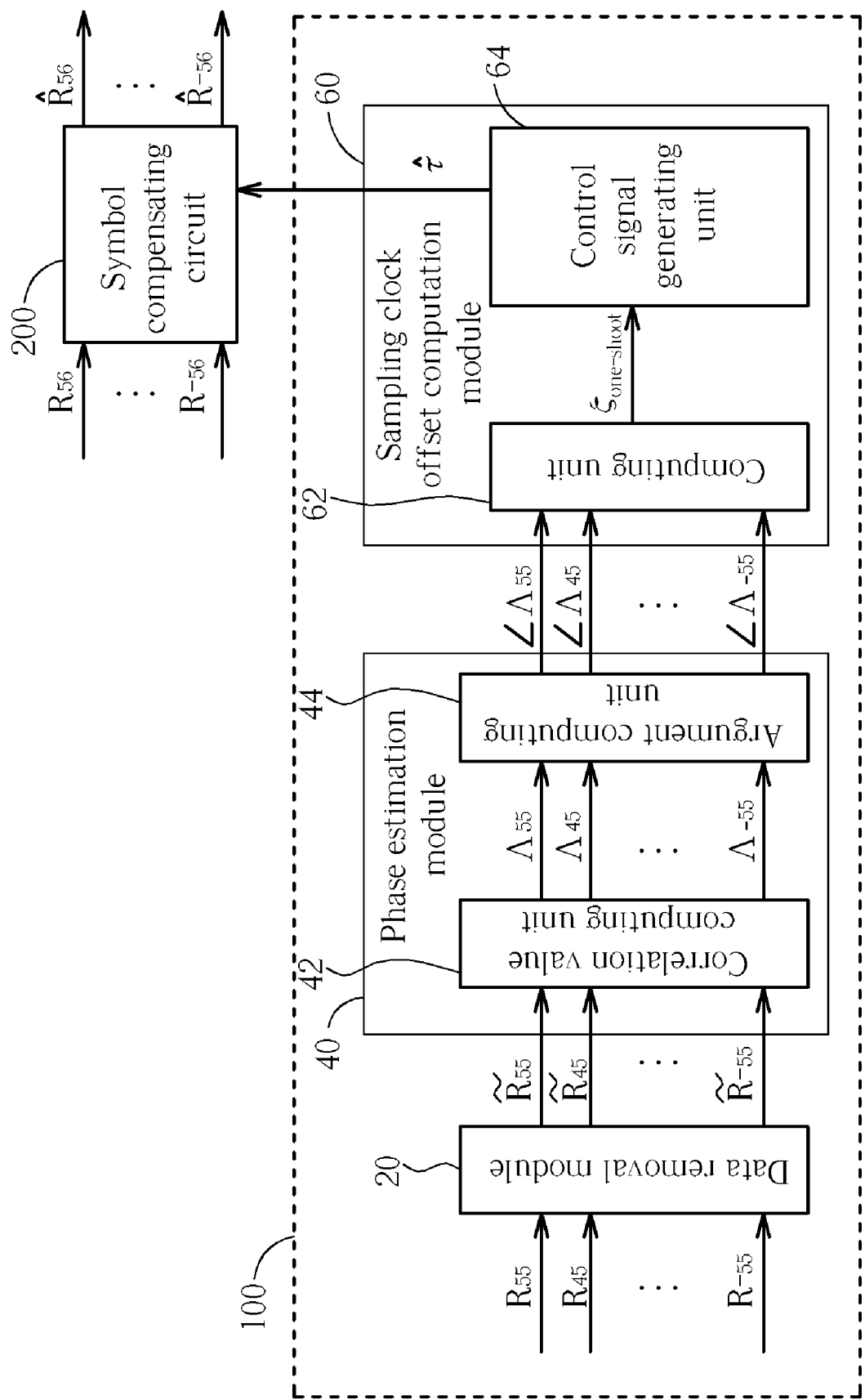
FIG. 1 is a diagram of a sampling clock tracking apparatus according to an embodiment of the present invention.

Please refer to FIG. 1. FIG. 1 is a diagram of a sampling clock tracking apparatus 100 according to an embodiment of the present invention. The sampling clock tracking apparatus 100 is applied in a multi-carrier communication system for estimating a preliminary sampling clock offset $\zeta_{one-shoot}$ according to a number of received symbols $R_{55}, R_{45}, \ldots, R_{-55}$ with corresponding pilot symbols, and generating a control signal $\hat{\tau}$ according to the preliminary sampling clock offset $\zeta_{one-shoot}$, and then transmitting the control signal $\hat{\tau}$ to a symbol compensating circuit 200 of the multi-carrier communication system to compensate all received symbols $R_{56}, \ldots, R_{-56}$ (which include data symbols and pilot symbols) in the multi-carrier communication system, to generate received symbols $\hat{R}_{56}, \ldots, \hat{R}_{-56}$, which are not influenced by sampling clock offsets. As shown in FIG. 1 the sampling clock tracking apparatus 100 comprises a data removal module 20, a phase estimation module 40, and a sampling clock offset computation module 60. First of all, for each received symbol R, the data removal module 20 generates a corresponding data removal symbol $\tilde{R}$ by removing a predetermined transmitted data X from the received symbol R. Please refer to the following equation for the operation of the data removal module 20:

$$\tilde{R}_{i,j,k} = R_{i,j,k} \cdot X_{i,j,k}^* \qquad \text{equation (2)}$$

In equation (2), $R_{i,j,k}$ denotes a received symbol transmitted by a $k^{th}$ sub-carrier within a $j^{th}$ band during a $i^{th}$ time period, and the naming and numbering rule should also fit for data removal symbols $\tilde{R}$ and conjugate values X" of the predetermined transmitted data.

In the present embodiment, the data removal module 20 processes received symbols $R(k=55, 45, \ldots, -55)$ of different sub-carriers in parallel. It should be noted that each sub-carrier of the sub-carriers corresponds to another sub-carrier, for example, the sub-carrier number "55" corresponds to the sub-carrier number "−55", whereas the two sub-carriers of mutual correspondence are in two non-adjacent quadrants of a constellation diagram. For example, if a value corresponding to the sub-carrier number "55" in a constellation diagram is equal to "p+q" (the first quadrant), then a value corresponding to the sub-carrier number "−55" in a constellation diagram would be equal to "−p−q" (the third quadrant). The phase estimation module 40 generates a phase shift ∠Λ by handling data removal symbols $\tilde{R}$ received in different time periods. The sampling clock offset computation module 60 generates a control signal $\hat{\tau}$ by making use of phase shifts ∠Λ that correspond to different sub-carriers, and compensates each received symbol R, which is transmitted through each sub-carrier, by using the control signal $\hat{\tau}$. Detailed operations of the phase estimation module 40 and the sampling clock offset computation module 60 will be described as follows.

As shown in FIG. 1, the phase estimation module 40 comprises a correlation value computing unit 42 and an argument computing unit 44. In the present embodiment, the correlation value computing unit 42 generates a correlation value $\Lambda$ by correlating data removal symbols $\tilde{R}_i$ and $\tilde{R}_{i-1}$ that belong to two adjacent time periods. Next, the argument computing unit 44 generates a phase shift $\angle\Lambda$ by computing the argument of the correlation value $\Lambda$. Please refer to the following equation for the operation of the correlation value computing unit 42.

$$\Lambda_{i,j,k} = \tilde{R}_{i,j,k} \cdot \tilde{R}_{i-1,j,k}^* \qquad \text{equation (3)}$$

The sampling clock offset computation module 60 comprises a computing unit 62 and a control signal generating unit 64. The computing unit 62 generates a coarse timing offset $\zeta_{one\text{-}shoot}$ according to phase shifts $\angle\Lambda$, which corresponds to different sub-carriers. Please refer to the following equation for the operation of the computing unit 62.

$$\zeta_{one\text{-}shoot,i} = \frac{1}{M_{i,j}} \cdot \frac{-N}{2\pi} \cdot \frac{\sum_k k \cdot \angle\Lambda_{i,j,k}}{\sum_k k^2} \qquad \text{equation (4)}$$

In equation (4), N denotes the number of sub-carriers of the multi-carrier communication system, and $M_{i,j}$ denotes the time interval of receiving time periods (the time interval between $\tilde{R}_i$ and $\tilde{R}_{i-1}$). Hence, $$\frac{-N}{2\pi} \cdot \frac{\sum_k k \cdot \angle\Lambda_{i,j,k}}{\sum_k k^2}$$

is approximately the average value of phase shifts that correspond to pilot symbols (k=55, 45, ..., -55), and the average value is divided by $M_{i,j}$ to generate a phase shift per unit of time, which is the coarse timing offset $\zeta_{one\text{-}shoot}$.

However, the coarse timing offset $\zeta_{one\text{-}shoot}$ is not an appropriate value to represent an accurate clock offset, so the coarse timing offset $\zeta_{one\text{-}shoot}$ cannot be directly used for compensating received symbols. As a result, the sampling clock tracking apparatus 100 must make use of the coarse timing offset $\zeta_{one\text{-}shoot}$ by generating a recursion value $\zeta_{smooth}$ with the control signal generating unit 64. Then, the control signal $\hat{\tau}$ is progressively adjusted utilizing the recursion value $\zeta_{smooth}$. Please refer to the following equation for the operation of generating a recursion value $\zeta_{smooth}$ from the coarse timing offset $\zeta_{one\text{-}shoot}$.

$$\zeta_{smooth,i} = \mu_i \cdot \zeta_{smooth,i-1} + (1-\mu_i) \cdot \zeta_{one\text{-}shoot,i} \qquad \text{equation (5)}$$

In equation (5), $\mu_i$ denotes an exponential weighting coefficient used for adjusting the recursion value $\zeta_{smooth}$ smoothly, by utilizing the coarse timing offset $\zeta_{one\text{-}shoot}$. Methods of applying an exponential weighting coefficient are well known in the art, so further description will not be included. In addition, please note that the weighted coefficient $\mu$ is not limited to the exponential weighting coefficient utilized in the present embodiment. The control signal generating unit 64 adjusts the control signal $\hat{\tau}$ progressively by utilizing the recursion value $\zeta_{smooth}$ and further compensates all received symbols in the multi-carrier communication system. Please refer to the following equation for the operation of control signal $\hat{\tau}$ adjustment.

$$\hat{\tau}_{i,j} = \hat{\tau}_{i-1,j} + \zeta_{smooth,i} \qquad \text{equation (6)}$$

Figure 2:
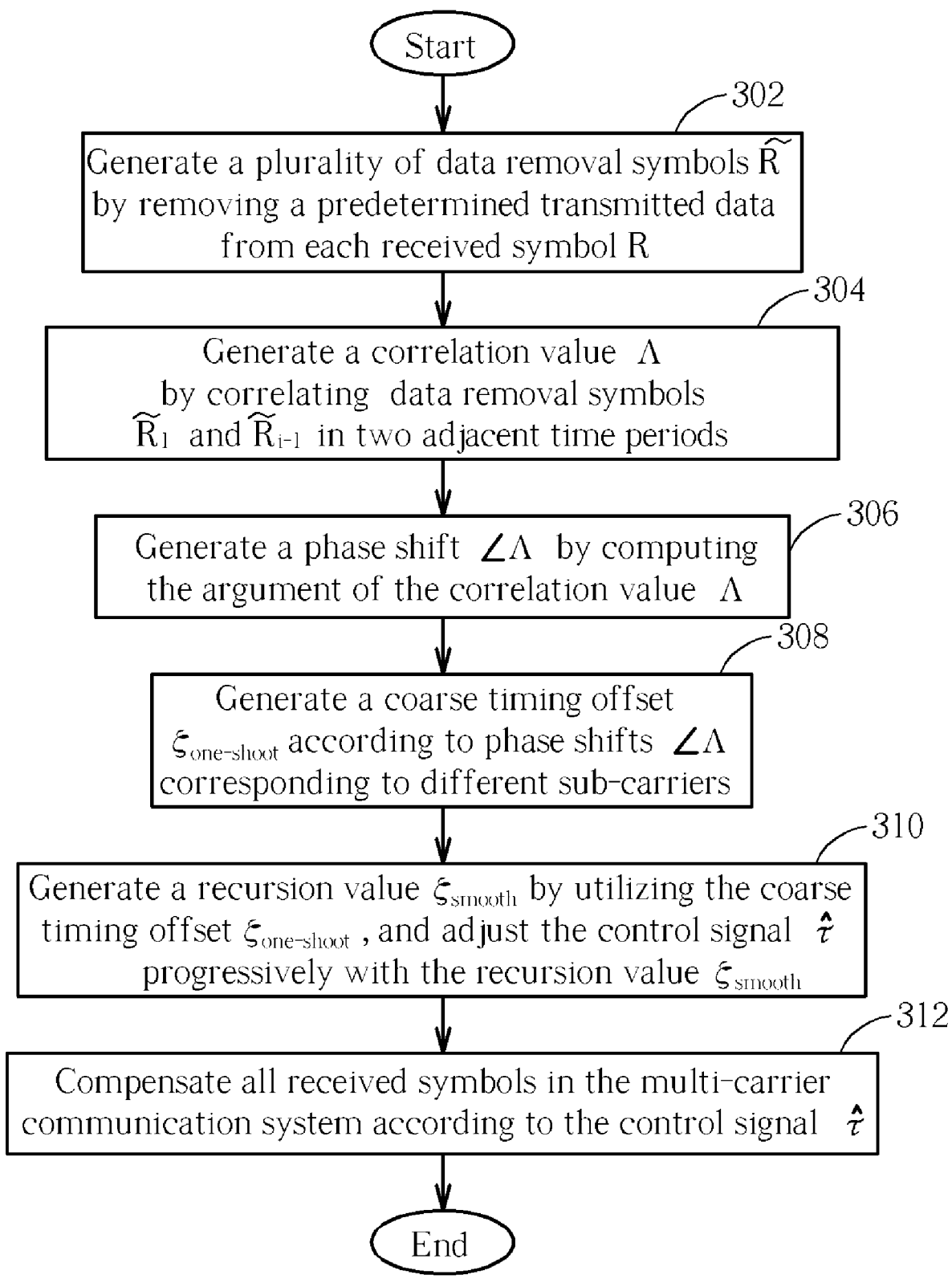
FIG. 2 is a flowchart describing the sampling clock tracking apparatus shown in FIG. 1 that compensates a plurality of received symbols in the multi-carrier communication system.

Please refer to FIG. 2. FIG. 2 is a flowchart describing the sampling clock tracking apparatus 100 shown in FIG. 1 that compensates a plurality of received symbols in the multi-carrier communication system. The operation of compensating all received symbols in the multi-carrier communication system by the sampling clock tracking apparatus 100 comprises the following steps:

Step 302: Generate a plurality of data removal symbols $\tilde{R}$ by removing a predetermined transmitted data from each received symbol R.

Step 304: Generate a correlation value $\Lambda$ by correlating data removal symbols $\tilde{R}_i$ and $\tilde{R}_{i-1}$ in two adjacent time periods.

Step 306 Generate a phase shift $\angle\Lambda$ by computing the argument of the correlation value $\Lambda$.

Step 308: Generate a coarse timing offset $\zeta_{one\text{-}shoot}$ according to phase shifts $\angle\Lambda$ corresponding to different sub-carriers.

Step 310: Generate a recursion value $\zeta_{smooth}$ by utilizing the coarse timing offset $\zeta_{one\text{-}shoot}$, and adjust the control signal $\hat{\tau}$ progressively with the recursion value $\zeta_{smooth}$.

Step 312: Compensate all received symbols in the multi-carrier communication system according to the control signal $\hat{\tau}$.

By generating a coarse timing offset $\zeta_{one\text{-}shoot}$ with a phase estimation module and a computing unit, a control signal $\hat{\tau}$ is progressively adjusted by utilizing a control signal generating unit according to the coarse timing offset $\zeta_{one\text{-}shoot}$. The control signal $\hat{\tau}$ of the present invention is capable of compensating all received symbols without the tedious computation of accurate clock offsets. Thus, the computation time and the load of the microprocessor of the system can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for tracking a sampling clock of a multi-carrier communication system, comprising:

a data removal module for generating a plurality of first data removal symbols by removing a predetermined transmitted data from a plurality of first received symbols, and generating a plurality of second data removal symbols by removing a predetermined transmitted data from a plurality of second received symbols, wherein the first and the second received symbols are transmitted respectively utilizing a first sub-carrier and a second sub-carrier, and the plurality of first received symbols and the plurality of second received symbols correspond to a plurality of time periods;

a phase estimation module coupled to the data removal module for generating a first phase shift according to correlation of the first data removal symbols, and generating a second phase shift according to correlation of the second data removal symbols;

a sampling clock offset computation module coupled to the phase estimation module for generating a control signal utilized to compensate the sampling clock of a plurality of received symbols according to the first and the second phase shifts;

a correlation value computing unit coupled to the data removal module for generating a first correlation value according to two first data removal symbols, the two first data removal symbols corresponding to a first time period and a second time period respectively, and generating a second correlation value according to two second data removal symbols, the two second data removal symbols corresponding to the first time period and the second time period respectively; and an argument computing unit coupled to the correlation value computing unit for generating the first and the second phase shifts by computing arguments of the first and the second correlation values respectively;

wherein the first time period is earlier than the second time period.

2. The apparatus of claim 1, wherein the first and the second sub-carriers are in two quadrants which are not adjacent in a constellation diagram.

3. The apparatus of claim 1, wherein the first and the second received symbols are pilot symbols.

4. The apparatus of claim 3, wherein the data removal module composes conjugation data corresponding to a first predetermined transmitted data and a first received symbol to generate a first data removal symbol, and composes conjugation data corresponding to a second predetermined transmitted data and a second received symbol to generate a second data removal symbol.

5. The apparatus of claim 1, wherein the sampling clock offset computation module comprises:

a computing unit coupled to the phase estimation module for generating an adding result according to the first and the second phase shifts, and generating a coarse timing offset by adjusting the adding result according to the plurality of time intervals of the time periods; and a control signal generating unit coupled to the computing unit for adjusting a recursion value according to the coarse timing offset, and adjusting the control signal according to the adjusted recursion value.

6. The apparatus of claim 5, wherein the recursion value in a first time period corresponds to a first value, and the control signal generating unit generates a second value for updating the recursion value by performing a weighting computation on the coarse timing offset and the first value in a second time period, whereas the second time period is after the first time period.

7. A method for tracking a sampling clock of a multi-carrier communication system, comprising:

generating a plurality of first data removal symbols by removing a predetermined transmitted data from a plurality of first received symbols, and generating a plurality of second data removal symbols by removing a predetermined transmitted data from a plurality of second received symbols, wherein the first and the second received symbols are transmitted utilizing a first sub-carrier and a second sub-carrier, respectively, and the plurality of first received symbols and the plurality of second received symbols correspond to a plurality of time periods;

generating a first phase shift according to correlation of the first data removal symbols;

generating a second phase shift according to correlation of the second data removal symbols;

generating a control signal;

utilizing the control signal to compensate the sampling clock of a plurality of received symbols according to the first and the second phase shifts;

generating a first correlation value according to two first data removal symbols, the two first data removal symbols corresponding to a first time period and a second time period respectively, and generating a second correlation value according to two second data removal symbols, the two second data removal symbols corresponding to the first time period and the second time period respectively; and generating the first and the second phase shifts by computing arguments of the first and the second correlation values respectively;

wherein the first time period is earlier than the second time period.

8. The method of claim 7, wherein the first and the second sub-carriers are in two quadrants that are not adjacent in a constellation diagram.

9. The method of claim 7, wherein the first and the second received symbols are pilot symbols.

10. The method of claim 9, wherein the step of generating the first data removal symbols comprises:

composing conjugation data corresponding to a first predetermined transmitted data and a first received symbol to generate a first data removal symbol.

11. The method of claim 10, wherein the step of generating the second data removal symbols comprises:

composing conjugation data corresponding to a second predetermined transmitted data and a second received symbol to generate a second data removal symbol.

12. The method of claim 7, wherein the step of generating the control signal comprises:

generating an adding result according to the first and the second phase shifts, and generating a coarse timing offset by adjusting the adding result according to the plurality of time intervals of the time periods;

adjusting a recursion value according to the coarse timing offset; and adjusting the control signal according to the adjusted recursion value.

13. The method of claim 12, wherein the recursion value in a first time period corresponds to a first value, and the step of adjusting the control signal comprises the process of generating a second value for updating the recursion value by performing a weighting computation on the coarse timing offset and the first value in a second time period, whereas the second time period is after the first time period.

* * * * *